United States Patent
Kousaki

Patent Number: 5,993,318
Date of Patent: Nov. 30, 1999

[54] GAME DEVICE, IMAGE SOUND PROCESSING DEVICE AND RECORDING MEDIUM

[75] Inventor: Tatsuya Kousaki, Tokyo, Japan

[73] Assignee: Kabushiki Kaisha Sega Enterprises, Tokyo, Japan

[21] Appl. No.: 08/964,378

[22] Filed: Nov. 6, 1997

[30] Foreign Application Priority Data

Nov. 7, 1996 [JP] Japan .................................. 8-295539

[51] Int. Cl.$^6$ ........................................................ A63F 9/22

[52] U.S. Cl. .................................. 463/35; 463/35; 434/69

[58] Field of Search ............................... 463/35, 30–34, 463/36, 40–44, 17; 381/17

[56] References Cited

U.S. PATENT DOCUMENTS

| | | | |
|---|---|---|---|
| 5,026,051 | 6/1991 | Lowe et al. | 463/35 |
| 5,052,685 | 10/1991 | Lowe et al. | 463/35 |
| 5,768,393 | 11/1995 | Mukojima et al. | 463/35 |
| 5,791,994 | 5/1995 | Hirano et al. | 463/43 |

OTHER PUBLICATIONS

Portion of "Sega Saturn Magazine", vol. 16, published Sep. 13, 1996.
Portion of "Sega Saturn Magazine", vol. 17, published Sep. 30, 1997.

Primary Examiner—Valencia Martin-Wallace
Assistant Examiner—Sheila Clayton
Attorney, Agent, or Firm—Finnegan, Henderson, Farabow, Garrett & Dunner, L.L.P.

[57] ABSTRACT

Sound processing technology is provided whereby sound can be changed to correspond to changes in the viewpoint for generating a virtual image. The sound processing device generates sound corresponding to a virtual image obtained by observing a virtual space from any one of a plurality of viewpoints set inside this space. It comprises sound generation conditions determining means for identifying the viewpoint of the virtual image currently being generated and determining sound generation conditions for the sound corresponding to the identified viewpoint, and sound generating means for generating sound based on sound signals in accordance with the determined sound generation conditions determined by the sound generation conditions determining means. A very realistic environment is provided to a player viewing the image.

17 Claims, 8 Drawing Sheets

ENGINE SOUND 1
(WHEN IDLING)

ENGINE SOUND 2
(EXTERNAL / LOW-REVS.)

ENGINE SOUND 3
(EXTERNAL / HIGH-REVS.)

ENGINE SOUND 4
(EXTERNAL / HIGH-REVS.)

ENGINE SOUND 5
(INTERNAL / ENGINE NOISE 1)

ENGINE SOUND 6
(INTERNAL / ENGINE NOISE 2)

GAME DEVICE, IMAGE SOUND PROCESSING DEVICE AND RECORDING MEDIUM

TECHNICAL FIELD

The present invention relates to a sound processing device installed in an image processing device, and more particularly, to improvements in sound processing technology applicable to a game device, or the like, which is capable of generating respectively a virtually created space (hereafter, called "virtual space") and images (virtual images) viewed from a plurality of viewpoints.

BACKGROUND ART

Conventionally, in game processing devices which conduct so-called "3D" image processing, whereby an object present in a virtual space is represented three-dimensionally, there have been game devices wherein the viewpoint can be switched. Here, "viewpoint" means the viewpoint from which models for playing a game (people or cars, etc.) are observed in a virtual space created for the purpose of playing the game. In terms of computer graphics, this means the viewpoint for converting to a viewpoint image system by converting the global coordinates system defining the virtual images to a field of view system.

In a game, unlike a simulator, the models operated by the players are observed from viewpoints which are generally impossible, in order to maintain operability and the excitement of the game. For example, in a baseball game, desirably, the viewpoint is not located at the actual position of the batter's eyes, but rather it is located in a position where the figure of the batter can be seen, such that the player can control the batter's actions. Furthermore, in a game featuring a car race, apart from the driver's viewpoint at the driving seat, there may also be a viewpoint which allows the whole of the car operated by the player to be seen. In other words, in many recent games, the player can select the position of the viewpoint as he or she desires.

However, in the aforementioned game processing devices, even if the viewpoint is switched, there is no change in the sound generated corresponding to the virtual image, and hence there is a lack of realism in playing the game.

Images in a game processing device are displayed three-dimensionally in order to raise the sense of realism and make the game more stimulating by basing the images provided in the game on the actual experience of the players. On the other hand, the realism of the game depends not only on the image display, but also on the high-quality sound provided corresponding to the virtual images. If realism is an important factor, then desirably, this sound should imitate the sound that the player might be expected to hear if he or she is assumed to be positioned at the viewpoint of the virtual space.

However, in conventional game processing devices, although it is possible to switch the viewpoint from which the virtual space is observed, since there is no corresponding change in the sound, there is a lack of unity between the image and the sound, and hence there is a poor sense of realism.

Furthermore, in conventional processing devices, if the viewpoint is switched, then the difficulty of the game changes. This is because the position of the viewpoint greatly affects the difficulty of the game. Namely, a viewpoint whereby it is possible to see the figure of the batter in a baseball game as described above, or the whole of a car in a car race game, makes it easier to judge, for instance, the distance to other objects in the game (objects displayed in the virtual space), and it becomes easier to comprehend the situation in which the model operated by the player is present, thus making it easier to play the game. In particular, in the case of a car race game, a viewpoint where the whole of the car can be seen is regarded as a viewpoint which makes the game relatively easier to play. On the other hand, in the case of a viewpoint which is located at the position of the driver s eyes, providing a view exactly as if the player is sitting in the driver's seat, although this has the effect of increasing the sense of realism, in fact it makes driving more difficult. Since there is a difference in operability between these games, if a game is played in correspondence with another player, then a player playing the game from a viewpoint at the driver's seat will be at a disadvantage compared to another player playing the game from a viewpoint where the whole of the car can be seen. This is because from a viewpoint at the driver's seat, it is difficult to assess the attitude of the car, for instance, if the car is sliding, or to observe others cars approaching from the rear at an early stage.

Therefore, it is necessary to make such changes in difficulty less likely to occur by providing different information to the player in response to changes in the viewpoint. In other words, if the visual information from the screen is insufficient, it is necessary to supplement this lack of information by means of sound. For this purpose, the game should be devised such that different sound effects are provided when the viewpoint is switched. If the sound effects can be changed in this way, then even if a viewpoint which is conventionally regarded as disadvantageous is selected, this disadvantage is offset by the sound, and a sense of challenge can be reintroduced into the game.

SUMMARY OF THE INVENTION

Therefore, a first object of the present invention is to provide sound processing technology whereby the sound can be changed in response to changes in the viewpoint for generating a virtual image.

A second object of the present invention is to provide sound processing technology whereby the volume of sound can be changed in response to changes in the viewpoint for generating a virtual image.

A third object of the present invention is to provide sound processing technology whereby the orientation of the sound can be changed in response to changes in the viewpoint for generating a virtual image.

A fourth object of the present invention is to provide sound processing technology whereby the frequency characteristics of the sound can be changed in response to changes in the viewpoint for generating a virtual image.

A fifth object of the present invention is to provide sound processing technology whereby the waveform of the sound can be shaped in response to changes in the viewpoint for generating a virtual image.

In a game device comprising viewpoint selecting means for changing between a plurality of viewpoints positioned relative to an object in a virtual space on the basis of a selection signal from a player, the invention for achieving the first object comprises:
a plurality of sound generating means for producing sound corresponding respectively to said plurality of viewpoints; and
sound selecting means for selecting one sound generating means from said plurality of sound generating means on the basis of viewpoint data selected by said viewpoint selecting means.

In a sound processing device which generates sound corresponding to a virtual image obtained by observing a virtual space from any one of a plurality of viewpoints set inside this space, the present invention comprises:

sound generation conditions determining means for identifying the viewpoint of said virtual image currently being generated and determining the sound generation conditions for the sound corresponding to the identified viewpoint; and sound generating means for producing sound based on sound signals in accordance with the sound generation conditions determined by said sound generation conditions determining means.

Furthermore, a viewpoint may be determined from said plurality of viewpoints by an instruction from the player, or it may be set by the game program.

According to the invention for achieving the second object, said generation conditions comprise the volume of said sound, and said sound generating means amplifies said sound signals up to a volume determined by said sound generation conditions determining means.

According to the invention for achieving the third object, said generation conditions comprise the orientation of said sound, and when producing a sound based on said sound signals, said sound generating means sets the orientation of the sound to an orientation determined by said sound generation conditions generating means.

According to the invention for achieving the fourth object, said generation conditions comprise the frequency characteristics of said sound, and said sound generating means shapes the waveform of said sound signals in accordance with frequency characteristics determined by said sound generation conditions determining means.

According to the invention for achieving the fifth object, said sound generating means comprises: a waveform data storing section for storing sound signal waveform data corresponding to each of said viewpoints; a sound generating section which reads out waveform data corresponding to the type of waveform determined by said sound generation conditions determining means from said waveform data storing section and generates said sound signals in accordance with the waveform data read out; and a processing section which processes the sound signals generated by said sound generating section in accordance with said sound generation conditions.

According to the present invention, said waveform data storing section stores a plurality of waveform data corresponding to one or more viewpoints, said sound generating section produces sound signals respectively from this plurality of waveform data when a virtual image is generated from a viewpoint for which a plurality of waveform data is stored in said waveform data storing section, and said processing section processes each of said sound signals in accordance with said sound generation conditions, the processed sound signals being synthesized to produce a sound which is output.

According to the invention for achieving the first object, said sound generation conditions determining means comprises: a sound generation conditions setting section wherein said sound generation conditions are preset corresponding to each of said viewpoints; a viewpoint identifying section which identifies the viewpoint of said virtual image; and a sound generation conditions determining section which reads out sound generation conditions corresponding to the viewpoint identified by said viewpoint identifying section from said sound generation conditions setting section and sets these as the generation conditions for the sound corresponding to said viewpoint.

The present invention is a game device comprising an image sound processing device as described above.

In a recording medium which stores programs for a sound processing device which generates sound corresponding to a virtual image obtained by observing a virtual space from any one of a plurality of viewpoints set inside this space, the invention for achieving the first object is a mechanically readable recording medium, characterized in that it stores programs for causing said sound processing device to implement:

a sound generation conditions determining step whereby the viewpoint of said virtual image currently being generated is identified, the generation conditions for the sound corresponding to the identified viewpoint are determined; and a sound generating step whereby sound based on sound signals is generated in accordance with the sound generation conditions determined by said sound generation conditions determining step.

Furthermore, a "recording medium" is an object on which information (principally, digital data and programs,) is recorded by a physical means of some kind, and it is capable of implementing prescribed functions in a processing device, such as a special processor, or the like. Briefly stated, it should be capable of downloading programs into a computer by some means or other, and causing the computer to execute prescribed functions. Examples of this recording medium include: a flexible disk, fixed disk, magnetic tape, optomagnetic disk, CD-ROM, DVD, ROM cartridge, RAM memory cartridge with battery back-up, flash memory cartridge, fixed RAM cartridge, or the like.

Cases where data is transferred from a host computer via a wired or wireless communications circuit (public circuit, data-only line, satellite circuit, etc.) are also included. The "Internet" is included in this description of recording media.

In a game device composed such that it is possible to change between a plurality of viewpoints positioned relative to an object in a virtual space, on the basis of a selection signal supplied from an input device, the invention for achieving the first object comprises:

a processing circuit which determines the viewpoint of the virtual space required to generate a display image on the basis of the selection signal supplied from said input device, and outputs viewpoint data showing the position of said viewpoint;

an image generating circuit which generates a display image of said virtual space on the basis of viewpoint data supplied from said processing circuit; and a sound generating circuit which outputs sound signals processed in accordance with the position of said viewpoint, on the basis of viewpoint data supplied from said processing circuit.

BEST MODE FOR CARRYING OUT THE INVENTION

Below, a best mode for implementing the invention is described with reference to the drawings. In this mode of implementation, the present invention is applied to a video game device. The subject of the game program is a car race.
(Description of the Composition)

Figure 1:
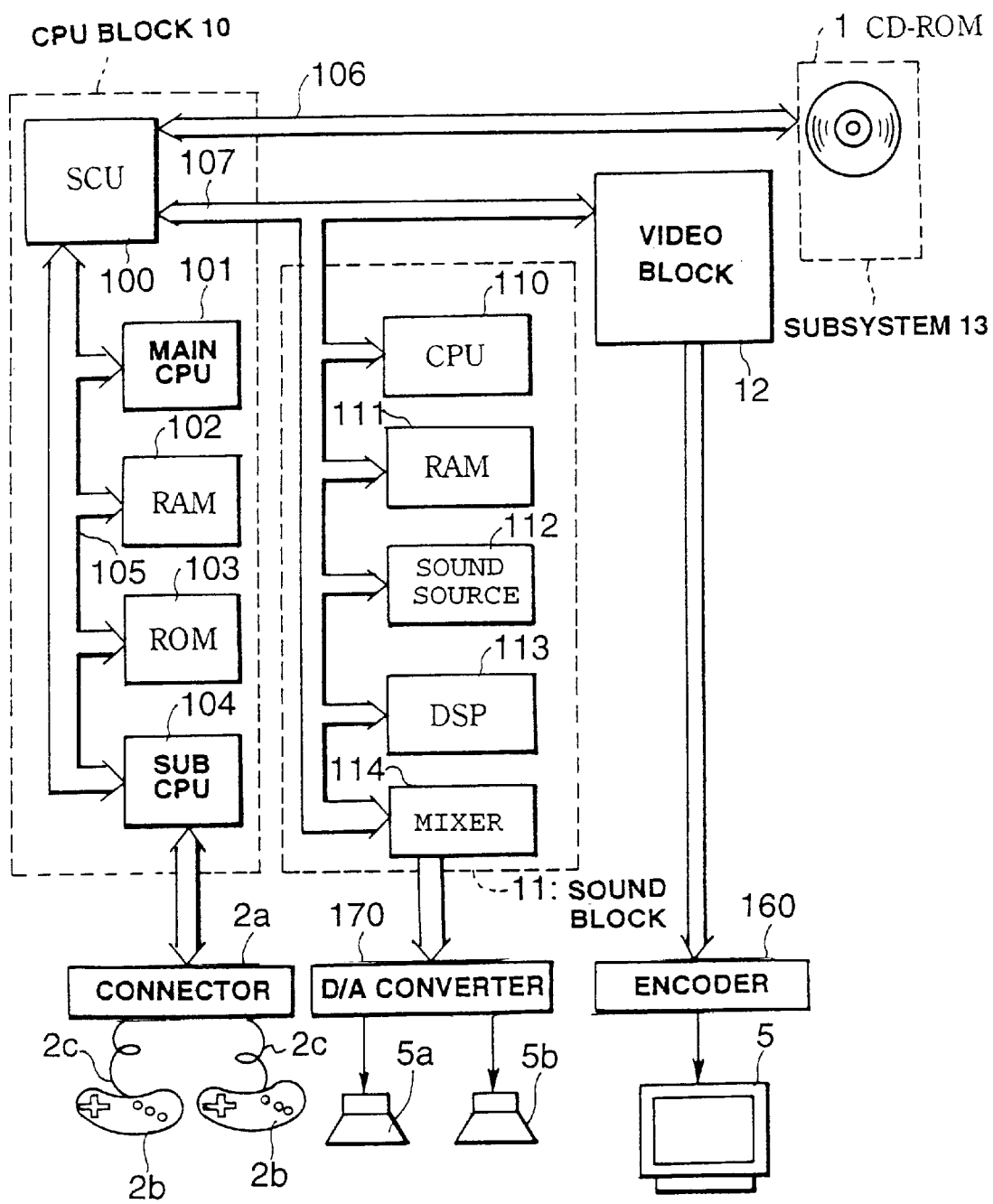
FIG. 1 is a general block diagram of a video game device in a mode for implementing the present invention.

FIG. 1 shows a block diagram of a video game device according to this mode of implementation to which the present invention is applied. As shown in FIG. 1, the video game device according to this mode of implementation comprises a CPU block 10 which controls the whole device, a sound block 11 which is a sound processing device relating to the present invention, and a sub-system 13 which provides read-out from a CD-ROM 1.
(Composition of CPU Block)

The CPU block 10 comprises an SCU (System Control Unit) 100, a main CPU 101, RAM 102, ROM 103, sub-CPU 104, CPU bus 105, and the like. In conjunction with the sound block, which is described below, the CPU block 10 forms the sound processing device according to the present invention.

The main CPU 101 is provided internally with a DSP (Digital Signal Processor), which implements high-speed processing in accordance with program data. The RAM 102 stores program data and various image data transferred from the subsystem 13 reading the CD-ROM, and it is also used as a work area for the main CPU 101. The ROM 103 stores initial program data for initialization processes conducted when the device is in an initialized state. The SCU 100 controls data transfer conducted between buses 105, 106 and 107. Furthermore, the SCU 100 is provided internally with a DMA controller and it transfers sound signals required during game processing to a RAM 111 in the sound block 11, and it transfers image data to the video block 12. Furthermore, it also transfers data indicating the position of the viewpoint used as the basis for generating the virtual image, to the sound block 11 and the video block 12. The sub-CPU 104 is called an SMPC (System Manager & Peripheral Control) and it gathers operating signals from pads 2b according to the requirements of the main CPU 101.

The pads 2b are connected to the CPU block 10 via connectors 2a and cables 2c. The pads 2b generate operating signals based on the operations of the players. In the video game device according to the present mode, the direction of travel of a car which can be moved by the player's operations (player's car) is determined by a cross-shaped key on the pad, whilst push buttons are used for operating the brakes and accelerator of the player's car.
(Composition of the Sound Block)

The sound block 11 comprises a CPU 110, RAM 111, sound source 112, DSP 113 and a mixer 114. The sound block 11 forms one part of the sound processing device according to the present invention.

The CPU 110 is used for sound processing, and it operates independently of the CPU block 10. In conjunction with the main 101, this CPU 110 realizes functions of the present invention (see FIG. 2, FIG. 3 and FIG. 14) as described below, in addition to which it inputs via the SCU 100 data relating to sound generation conditions and waveform data contained in the program data read out from the CD-ROM, and stores this data in the RAM 111. Furthermore, it is able to communicate with the main CPU 101. This communication is conducted via the RAM 111 in the sound block 11.

Program data used to operate the CPU 110, and instructions from the CPU 110, sound source 112, DSP 113 and main CPU 101 are written into the RAM 111, in addition to which it also stores data relating to sound generation conditions and waveform data transferred from the CD-ROM and waveform data generated by FM voice synthesis.

The sound source 112 conducts PCM voice synthesis and FM voice synthesis on the basis of waveform data stored in the RAM 111 and waveform data from an internal oscillator. It also carries out reverse or repeat processing, or the like, based on this waveform data.

The DSP 113 is a special high-speed calculating circuit which conducts high-speed calculations based on instructions from the CPU 110 and the waveform data supplied from the RAM 111 and the sound source 112. According to the various instructions, it implements special effects, such as echo, reverb, chorus, etc. and filter processing based on a desired transfer function.

The mixer 114 adjusts the volume of the output sound signal and the orientation (pan pot) of the sound image according to the instructions from the CPU 110, and outputs the sound.

A D/A converter 170 and speakers 5a and 5b are connected to this sound block 11. The D/A converter 170 converts a two-channel sound signal generated by the sound block 11 to an analogue signal, and it is connected to the speakers 5a and 5b.

In the flow of data relating to sound, firstly, a MIDI-format command is supplied from the CD-ROM 1 with the image data. The SCU 100 transfers this command to the sound block 11. If special waveform data is supplied from the CD-ROM 1, then the SCU 100 also transfers this to the RAM 111. The main CPU 101 determines the volume, orientation, use or absence of waveform shaping, and the waveform data used, in accordance with the viewpoint used to generate the virtual image, and it writes this data to the RAM 111 in the form of instructions. The CPU 110 in the sound block 11 refers to the waveform data identified in the MIDI data contents and causes the sound source 112 to generate a sound signal. If a command indicating sound generation conditions is present, then the CPU 110 causes the DSP 113 and the mixer 114 to implement processing corresponding to the details of volume, orientation and frequency characteristics indicated by this command.
(Composition of the Video Block)

The video block 12 generates virtual images. Specifically, it generates data for model images, such as cars, obstacles, people, and the like, on the basis of polygon data and viewpoint data etc. transferred from the CPU block 10, and it conducts movement processing of the background image, synthesis of the background image and model images, shading processing, and clipping. The generated virtual image data is supplied to the monitor device 5 as a video signal and an image is displayed.

(Composition of Other Blocks)

The subsystem 13 is fitted with a CD-ROM drive or the like, and it performs the function of reading out application software supplied by the CD-ROM 1 and reproducing image data, etc.

(Composition of Functional Blocks)

Figure 2:
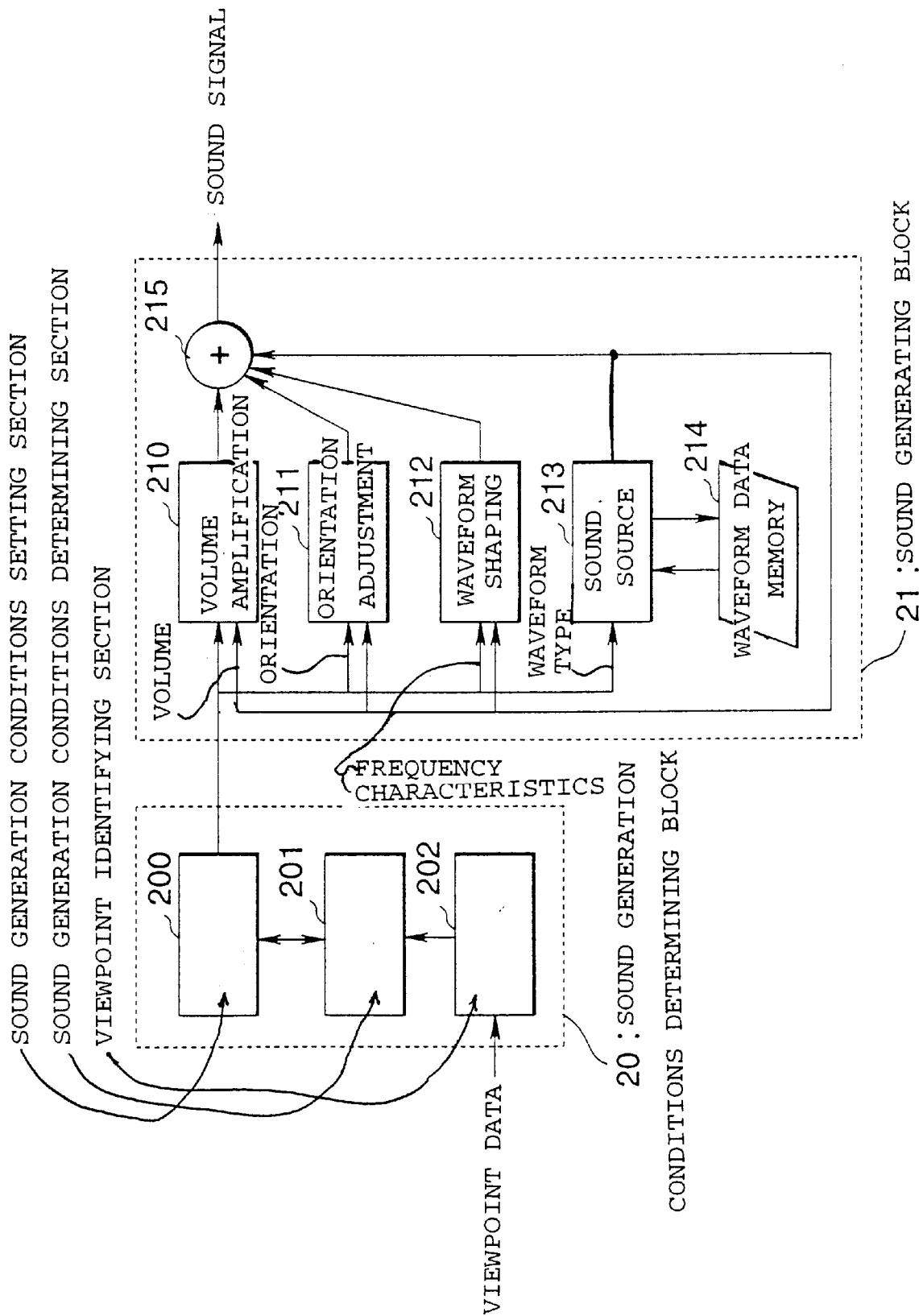
FIG. 2 is a functional block diagram of a mode for implementing the present invention.

FIG. 2 shows a functional block diagram wherein the functions in the mode for implementing the present invention are depicted as blocks. These functional blocks are realized by operation of the main CPU 101 in the CPU block 10 and the CPU 110 in the sound block 11. The processing of the functions in the present mode is divided principally between a sound generation conditions determining block 20 and a sound generating block 21. MIDI data for source sound signals to be reproduced along with the virtual images is transferred continuously from the CD-ROM 1 via the SCU to the RAM 111.

The sound generation conditions determining block 20 comprises a sound generation conditions setting section 200, a sound generation conditions determining section and a viewpoint identifying section 202, and it is realized principally by processing in the CPU block 10.

The viewpoint identifying section 202 refers to viewpoint data stored in the RAM 111 and identifies the viewpoint of the virtual image currently being displayed. The sound generation conditions determining section 201 determines sound generation conditions for the generation of sound on the basis of the viewpoint identified by the viewpoint identifying section 202. The sound generation conditions setting section 200 presets sound generation conditions for each viewpoint, and it outputs sound generation conditions according to instructions from the sound generation conditions determining section 201. This sound generation conditions setting section 200 corresponds principally to the RAM 102 or ROM 103.

The sound generating block 21 comprises a volume amplifying section 210, orientation adjusting section 211, waveform shaping section 212, sound generating section 213, waveform data memory 214 and a synthesizing section 215, and it is realized principally by processing conducted in the sound block 11.

When the contents of the instructions given by the sound generation conditions determining block 20 indicate a change in volume, the volume amplifying section 210 changes the level of the sound signal generated from waveform data specified by the MIDI data, in accordance with these instructions. In specific terms, this means that the CPU 111 transmits a command to the mixer to change the volume.

When the contents of the instructions given by the sound generation conditions determining block 20 indicate a change in sound orientation, the orientation adjusting section 211 changes the balance between the two channels of the sound signal, thus changing the orientation of the sound image.

When the contents of the instructions given by the sound generation conditions determining block 20 indicate a change in frequency characteristics, the waveform shaping section 212 conducts filter processing such that the sound signal has these frequency characteristics. In specific terms, the CPU 110 sets the DSP 113 to the coefficient of the transfer function indicated by these filter processing contents, and the DSP 113 shapes the waveform of the sound signal.

The sound generating section 213 calls up waveform data specified by the MIDI data from the waveform data memory 214 and generates a sound go signal. If the sound generation conditions indicate sound generation based on plural types of waveform data, then a plurality of waveform data are read out successively and are output respectively as sound signals.

The waveform data memory 214 corresponds to the RAM 111, and it stores waveform data forming the basis for source sound signals.

The synthesizing section 215 synthesizes signals supplied from each block 210–213 and outputs sound signals.

Figure 14:
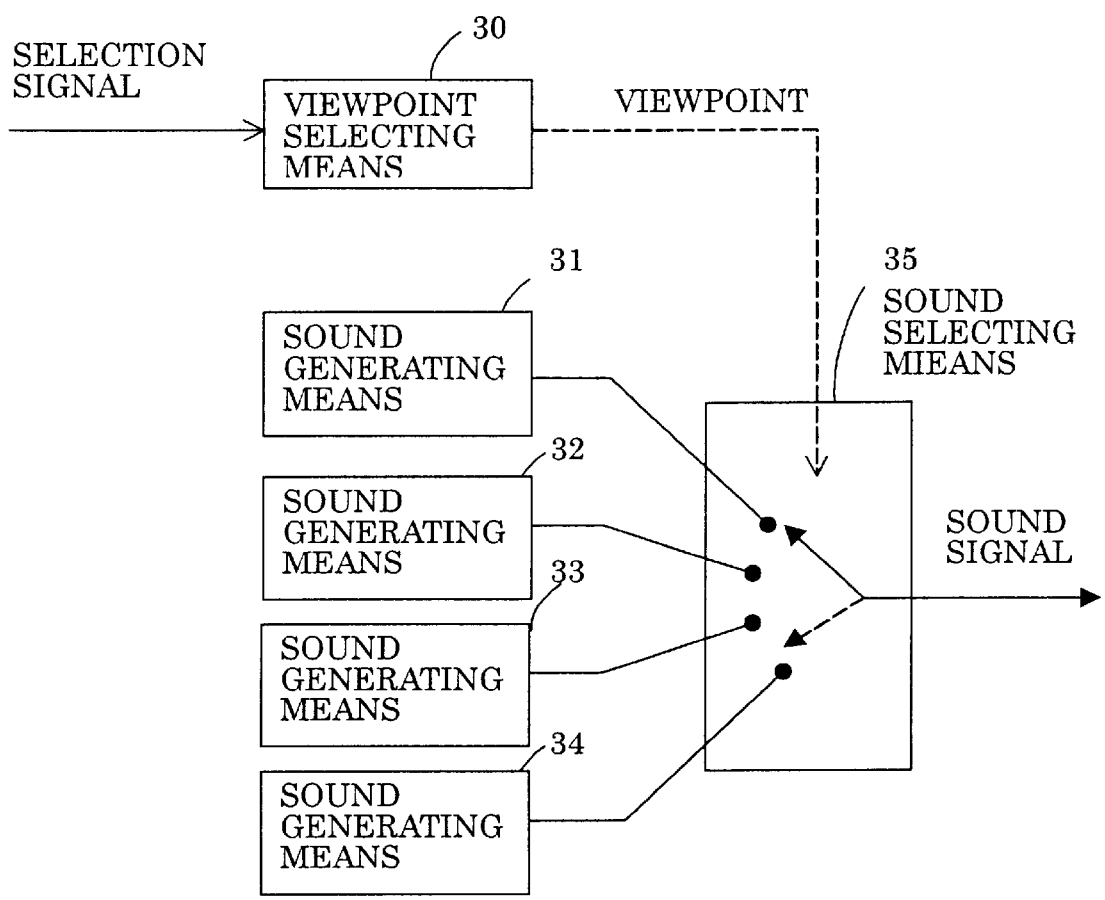
FIG. 14 is a second functional block diagram in a mode for implementing the present invention.

FIG. 14 shows a second functional block diagram wherein the functions of the present invention are divided upon a different basis. As shown in FIG. 14, the present invention is provided with viewpoint selecting means 30, a plurality of sound generating means 31–34, and sound selecting means 35.

The viewpoint selecting means 30 is realized by the CPU block 10. It selects a viewpoint for observing the virtual image on the basis of a selection signal for selecting the viewpoint, and it is composed such it can output viewpoint data indicating the spatial position of the viewpoint.

The sound selecting means 31–34 are realized by the sound block 11 and are composed such that they can generate different sounds, respectively. These correspond, for example, to functional blocks which output the respective sound signals ultimately output from the synthesizing section 215 by means of the volume amplifying section 210, orientation adjusting section 211, waveform shaping section 212 or sound generating section 213, in the functional blocks illustrated in FIG. 2, or a combination of these sections.

The sound selecting means 35 is composed such that any one of the sound signals output from the plurality of sound generating means 31–34 on the basis of the viewpoint data can be selected.

The functions realized by the function blocks shown in FIG. 14 ultimately correspond to the functions realized by the function blocks illustrated in FIG. 2.

(Description of the Operation)

Next, the operation of the present mode is described. In the video game device according to the present mode, the player can freely switch the viewpoint for generating virtual images by operating a pad 2b. Viewpoint data indicating which viewpoint has been selected by the player is stored in the RAM 102. At the same time, this data is transferred to the sound block 11.

Figure 4:
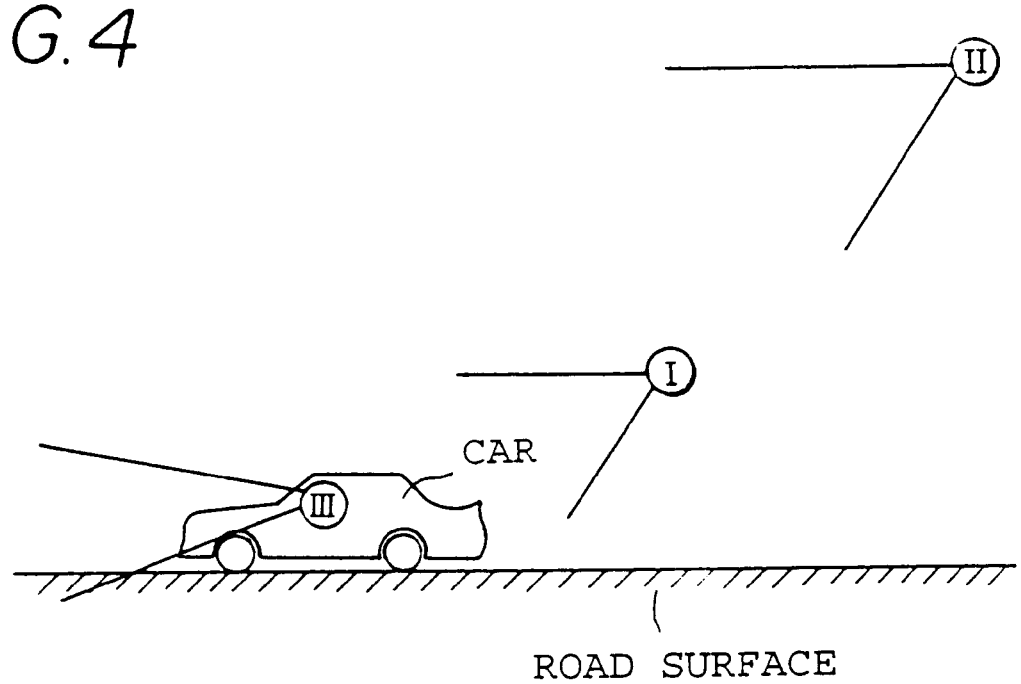
FIG. 4 is a diagram showing the positional relationship between a player's car and a viewpoint in a virtual space.
Figure 5:
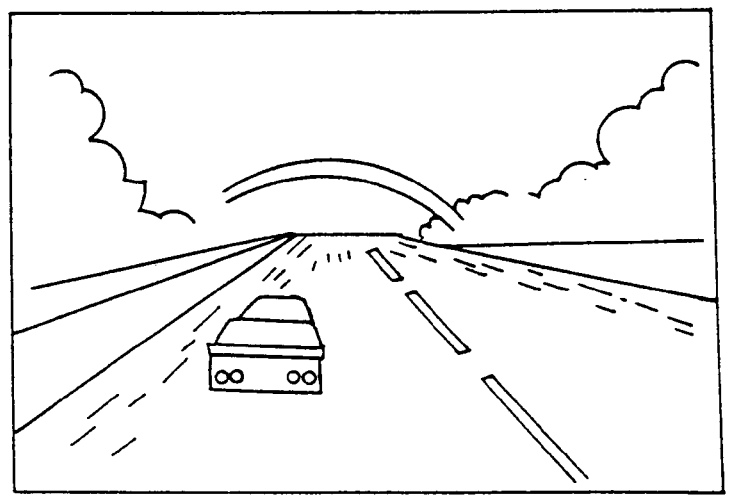
FIG. 5 is an image display example corresponding to viewpoint I.
Figure 6:
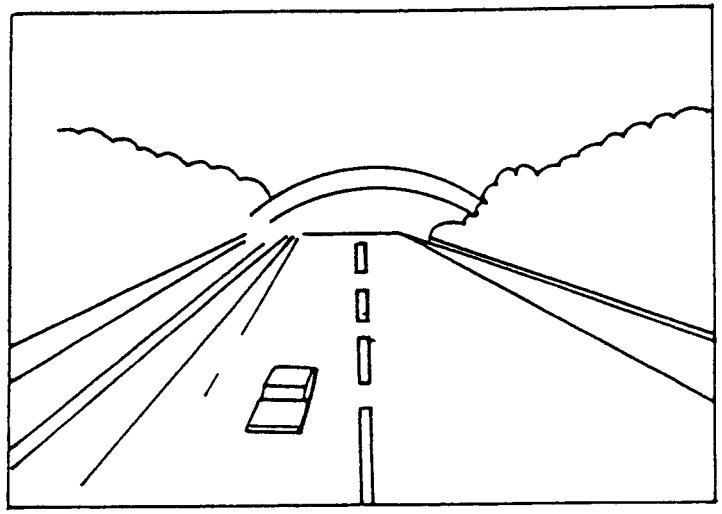
FIG. 6 is an image display example corresponding to viewpoint II.
Figure 7:
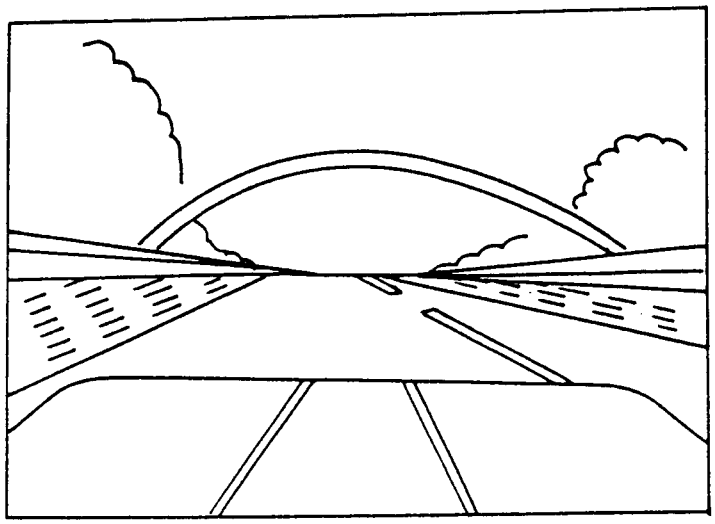
FIG. 7 is an image display example corresponding to viewpoint III.

FIG. 4 shows positional relationships in a virtual space between viewpoints and a car (player's car) which can be "driven" by a player by operating a game pad 2b. I indicates the viewpoint which is used generally. This viewpoint is positioned slightly to the rear of the player's car, and as FIG. 5 illustrates, the whole of the car is contained in the field of view in the image obtained from this viewpoint. II indicates a viewpoint providing an image similar to that obtained if the player's car were observed from a helicopter flying in the sky. This viewpoint is positioned to the rear of, and well above, the player's car, and as shown in FIG. 6, the player's car is contained in the centre of the field of view and a broad view of the circuit ahead is visible in the image obtained from this viewpoint. III indicates a viewpoint providing an image equivalent to that seen by a driver sitting in the player's car. This viewpoint is positioned at the driving seat of the player's car, and as shown in FIG. 7, a forward view of the circuit from the actual driver's seat is visible in the image obtained from this viewpoint.

Figure 3:
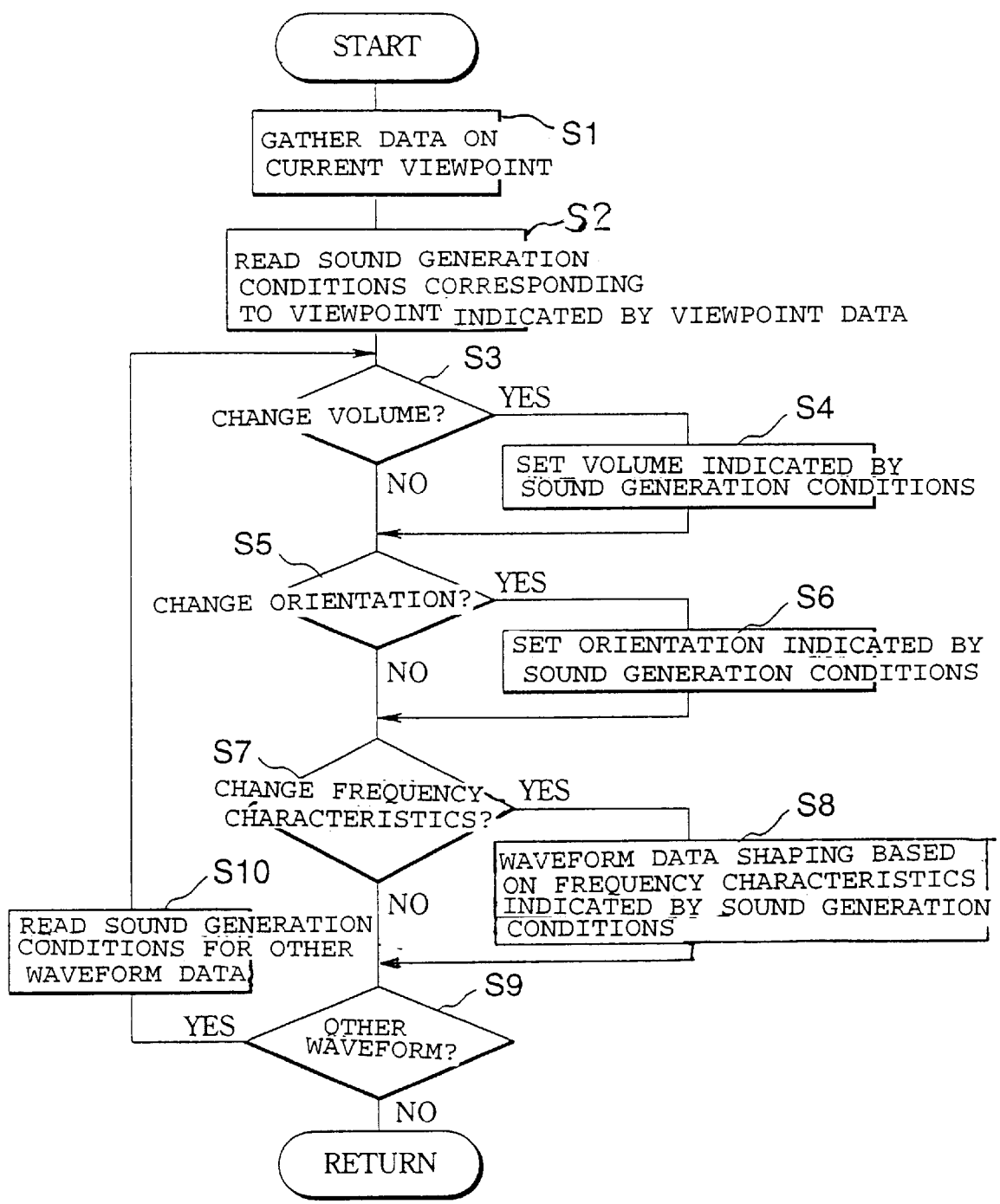
FIG. 3 is a flowchart describing the operation of a video game device in a mode for implementing the present invention.

FIG. 3 shows a flowchart illustrating the operation of the present mode. This processing routine is read out each time the player indicates a change of viewpoint. The processing described below is implemented for each of a plurality of waveform data that are present.

Step S1: Firstly, the viewpoint identifying section 202 (main CPU 101) refers to viewpoint data stored in the RAM 102 and identifies which of the viewpoints in FIG. 4 is currently being used.

Step S2: Thereupon, the sound generation conditions determining section 201 (main CPU 101) determines which of the sound generation conditions stored in the RAM 102 are to be used, according to the contents of the viewpoint data. It then reads out sound generation conditions from the address in the sound generation conditions setting section 200 (RAM 102) where these sound generation conditions are stored, and transfers these to the sound generating block 21 (sound block 11).

Table 1 shows the relationship between the sound generation conditions set for each viewpoint.

TABLE 1

Figure 8:
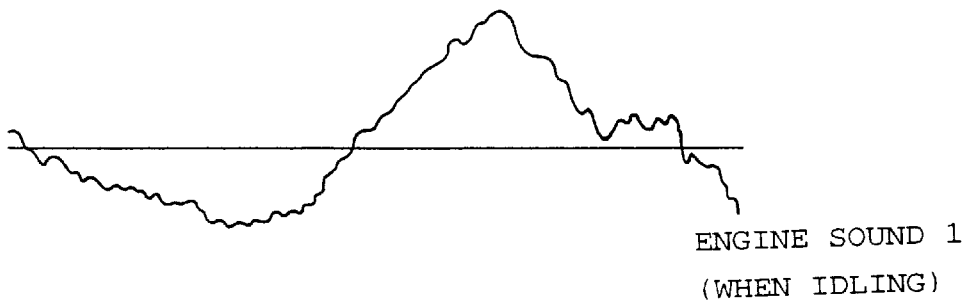
FIG. 8 is an approximate waveform diagram of an engine sound 1.
Figure 9:
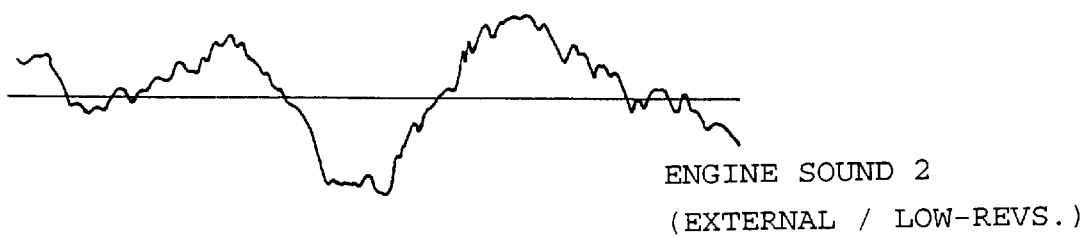
FIG. 9 is an approximate waveform diagram of an engine sound 2.
Figure 10:
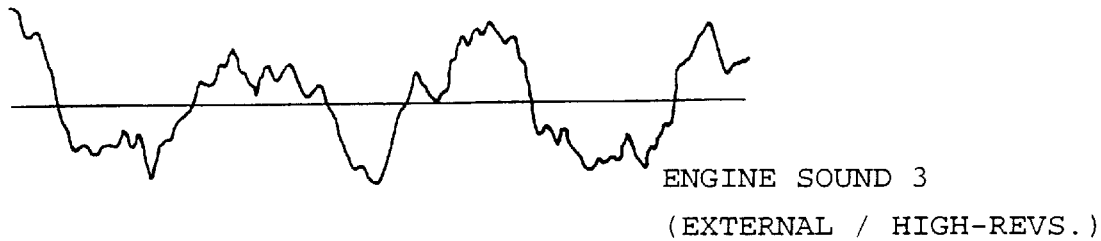
FIG. 10 is an approximate waveform diagram of an engine sound 3.
Figure 11:
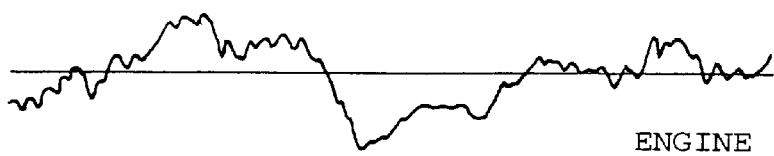
FIG. 11 is an approximate waveform diagram of an engine sound 4.
Figure 12:
FIG. 12 is an approximate waveform diagram of an engine sound 5.
Figure 13:
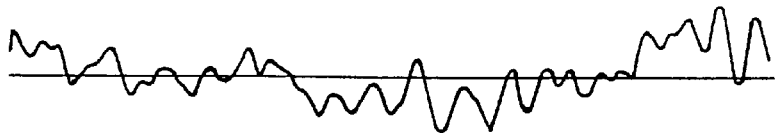
FIG. 13 is an approximate waveform diagram of an engine sound 6.

| Waveform | Viewpoint I (standard external view) | Viewpoint II (aerial external view) | Viewpoint III (internal view) |
| --- | --- | --- | --- |
| Engine Sound 1 (idling: FIG. 8) | 60 | 30 | 100 |
| Engine Sound 2 (External; low revs: FIG. 9) | 100 | 50 | 80 |
| Engine Sound 3 (External; high revs: FIG. 10) | 100 | 50 | 0 |
| Engine Sound 4 (Internal; high revs: FIG. 11) | 20 | 10 | 100 |
| Engine Sound 5 (Internal engine sound 1: FIG. 12) | 0 | 0 | 100 |
| Engine Sound 6 (Internal engine sound 2: FIG. 13) | 0 | 0 | 100 |
| Orientation | Central | Central | Left / Right |
| Frequency characteristics | No shaping | Boost high frequencies | Boost low frequencies |

In Table 1, the "waveform" column indicates the type of waveform data used. The figures in each column indicate the volume allocated to the waveform data. Where a plurality of waveform data are allocated to a single viewpoint, this indicates that the plurality of waveform data are synthesized. As shown in Table 1, in the present mode of implementation, six types of waveform data are used. Even using the respective sound generation data independently, it is possible to create characteristic engine sounds, but by synthesizing a plurality of waveform data, it is possible to produce a richer sound.

Step S3: If there is a change in volume when the viewpoint is changed (YES), then the volume assigned to the new viewpoint according to Table 1 is transferred to the sound generating block as a sound generation condition (S4). Specifically, a new volume is designated to the sound block 11 as a sound generation condition. In this case, different volumes are designated for each waveform data.

Step S5: If there is a change in sound orientation when the viewpoint is changed (YES), then a new orientation according to Table 1 is transferred to the sound generating block 21 (S6). Specifically, a new orientation is designated to the sound block 11 as a sound generation condition. According to Table 1, the orientation is changed in cases where the viewpoint changes from an external viewpoint (viewpoint I or viewpoint II in FIG. 7) to an internal viewpoint (viewpoint III), or vice versa.

Step S7: If there is a change in the frequency characteristics when the viewpoint changes (YES), then frequency conditions for achieving new frequency characteristics according to Table 1 are transferred to the sound generating block 21 as a sound generation condition (S8). Specifically, new frequency conditions are designated as a sound generation condition to the sound block 11. The frequency characteristics of the source sound signal are changed in the case of viewpoint II or viewpoint III. With viewpoint II, since the viewpoint is a long way from the track, the lower frequencies are attenuated, whilst the higher frequencies are emphasized relatively. With viewpoint III, since the viewpoint is located inside the car, it is more realistic to emphasize the lower frequencies caused by vibrations transmitted through the vehicle.

Step S9: If there is further waveform data for which the sound generation conditions have not been set (YES), then the sound generation conditions determining section 201 reads out the sound generation conditions for this further waveform data from the sound generation conditions setting section 200 (S10), and transfers it to the sound generating block 21. The aforementioned processing steps S3–S8 are repeated by the sound generating block 21.

It is not necessary for all waveform data to be changed to alter the sound. No changes need to be applied to the waveform data for sounds other than the relevant sound, namely, the sound of the player's car in the present mode. Examples of sounds other than the relevant sound include environmental sounds, such as wind or wave noises, spectator's cheering, etc., which are not related to the sound of the player's car. In this way, information such as the fact that the wind is strong, for example, can be transmitted continuously, whichever viewpoint is selected.

Furthermore, information such as the fact that the player's car has been damaged by a collision, or the like, is provided as image information, whereby the damaged body of the player's car is displayed, to the player when a viewpoint outside the player's car is selected, and it is provided as sound information, whereby the engine sound is changed, to the player when the driver's seat viewpoint is selected.

Therefore, whichever viewpoint selected by the player, there is no great change in the difficulty of the game.

(Other Modifications)

The present invention is not limited to the mode of implementation described above, and various modifications thereof are possible.

For example, in the mode of implementation described above, the viewpoint switching is limited to three positions, but the present invention is not limited to this, and the number of viewpoints can be increased. The sound generation conditions data should be increased in line with the number of viewpoints.

Moreover, the viewpoint may be moved from one position to the next along a desired path in the virtual space. In this case, assuming that the player's car has an engine, the generation conditions should be changed continuously according to the relative distance between the position corresponding to this engine and the viewpoint. In this case, since the distance from the road surface also changes, the frictional noise of the tires and road surface may be added to the waveform data and the sound generation conditions based on this waveform data may be changed according to the distance between the road surface and the viewpoint.

Furthermore, the present invention may be applied not only to a video game device based on a car race, as in the mode of implementation described above, but also to a video game device based on another sport, such as baseball, or the like. Moreover, in addition to game applications, the present invention may also be applied to an image sound processing device which combines images and sounds, such as a flight simulator.

The entire disclosure of Japanese Patent Application NO.8-295539 filed on Nov. 7, 1996 including specification, claims, drawings and summary are incorporated herein by reference in its entirety.

Industrial Applicability

According to the present invention, since sound generation conditions are determined according to changes in the viewpoint of the virtual image currently being produced, and sound based on sound signals is generated in accordance with these sound generation conditions, the details of the sound can be changed to correspond with changes in the virtual image.

Therefore, whenever the viewpoint of the virtual image changes, the player senses a change in the sound equivalent to that experienced in real life when there is a change in the viewpoint, thereby providing a player watching the virtual image and listening to the corresponding sound with a very realistic experience.

Furthermore, when the present invention is applied to a game device, since different sound effects are obtained each time the viewpoint is switched, then even if a viewpoint which is conventionally regarded to be disadvantageous is selected, this disadvantage can be offset by means of the sound, and a sense of challenge can be reintroduced into the game.

Moreover, a merit is also obtained in that since the sound is changed for each viewpoint, the player is not likely to lose interest.

I claim:

1. A game device comprising:
   viewpoint selecting means for selecting one viewpoint among a plurality of viewpoints positioned relative to an object in a virtual space on the basis of a selection signal from a player,
   a plurality of sound generating means for producing sound corresponding respectively to said plurality of viewpoints and realizing a predetermined realistic audio environment in correspondence with the viewpoint selected by said viewpoint selecting means; and
   sound selecting means for selecting one sound generating means from said plurality of sound generating means on the basis of said selected viewpoint.

2. A sound processing device which generates sound corresponding to a virtual image obtained by observing a virtual space from any one of a plurality of viewpoints set inside this space, comprises:
   sound generation conditions determining means for identifying the viewpoint of said virtual image currently being generated and determining the sound generation conditions; and
   sound generating means for producing sound based on sound signals in accordance with the sound generation conditions determined by said sound generation conditions determining means, wherein the produced sound is capable of realizing a predetermined realistic audio environment in correspondence with the identified viewpoint and the predetermined sound generation conditions.

3. The game device comprising an image sound processing device according to claim 2.

4. The sound processing device according to claim 2, wherein said generation conditions comprise the volume of said sound, and said sound generating means amplifies said sound signals up to a volume determined by said sound generation conditions determining means.

5. The game device comprising an image sound processing device according to claim 4.

6. The sound processing device according to claim 2, wherein said generation conditions comprise the panning of said sound, and when producing a sound based on said sound signals, said sound generating means sets the panning of the sound to a panning determined by said sound generation conditions generating means.

7. The game device comprising an image sound processing device according to claim 6.

8. The sound processing device according to claim 2, wherein said generation conditions comprise the frequency characteristics of said sound, and said sound generating means shapes the waveform of said sound signals in accordance with frequency characteristics determined by said sound generation conditions determining means.

9. The game device comprising an image sound processing device according to claim 8.

10. The sound processing device according any of claims 4, 6 or 8, wherein said sound generating means comprises: a waveform data storing section for storing sound signal waveform data corresponding to each of said viewpoints; a sound generating section which reads out waveform data corresponding to the type of waveform determined by said sound generation conditions determining means from said waveform data storing section and generates said sound signals in accordance with the waveform data read out; and a processing section which processes the sound signals generated by said sound generating section in accordance with said sound generation conditions.

11. The game device comprising an image sound processing device according to claim 10.

12. The sound processing device according to claim 10, wherein said waveform data storing section stores a plurality of waveform data corresponding to one or more viewpoints, said sound generating section produces sound signals respectively from this plurality of waveform data when a virtual image is generated from a viewpoint for which a plurality of waveform data is stored in said waveform data storing section, and said processing section processes each of said sound signals in accordance with said sound generation conditions, the processed sound signals being synthesized to produce a sound which is output.

13. The game device comprising an image sound processing device according to claim 12.

14. The image sound processing device according to claim 2, wherein said sound generation conditions determining means comprises a sound generation conditions setting section wherein said sound generation conditions are preset corresponding to each of said viewpoints; a viewpoint identifying section which identifies the viewpoint of said virtual image; and a sound generation conditions determining section which reads out sound generation conditions corresponding to the viewpoint identified by said viewpoint identifying section from said sound generation conditions setting section and sets these as the generation conditions for the sound corresponding to said viewpoint.

15. The game device comprising an image sound processing device according to claim 14.

16. A recording medium which stores programs for a sound processing device which generates sound corresponding to a virtual image obtained by observing a virtual space from any one of a plurality of viewpoints set inside this space, a mechanically readable recording medium, characterized in that it stores programs for causing said sound processing device to implement:

a sound generation conditions determining means whereby the viewpoint of said virtual image currently being generated is identified and the sound generation conditions are determined; and a sound generating means whereby sound based on sound signals is generated in accordance with the sound generation conditions determined by said sound generation conditions determining step, wherein the generated sound is capable of realizing a predetermined realistic audio environment in correspondence with the identified viewpoint and the determined sound generation conditions.

17. A game device composed such that it is possible to change between a plurality of viewpoints positioned relative to an object in a virtual space, on the basis of a selection signal supplied from an input device, a game device characterized in that it comprises:

a processing circuit which determines the viewpoint of the virtual space required to generate a display image on the basis of the selection signal supplied from said input device, and outputs viewpoint data showing the position of said viewpoint;

an image generating circuit which generates a display image of said virtual space on the basis of viewpoint data supplied from said processing circuit; and a sound generating circuit which outputs sound signals on the basis of viewpoint data supplied from said processing circuit, wherein the sound produced by said sound signals is capable of realizing a predetermined realistic audio environment in correspondence with the predetermined viewpoint.

* * * * *